May 31, 1960     R. E. RICHARDSON     2,938,293
FISHING LURE
Filed April 17, 1956

*INVENTOR.*
ROBERT E. RICHARDSON
BY
*Clayton J. Toddy*
ATTORNEY

United States Patent Office 2,938,293
Patented May 31, 1960

2,938,293

FISHING LURE

Robert E. Richardson, 2329 13th St., Akron, Ohio

Filed Apr. 17, 1956, Ser. No. 578,683

2 Claims. (Cl. 43—42.24)

This invention relates to fishing lures, and its general object is to provide a fishing lure made of resilient plastic compositions having an appearance and feel simulating that of a natural minnow and having the action of a natural minnow in water.

A further object of this invention is to provide an artificial fishing lure having an action in water wherein the entire body of the lure rapidly pivots about an axis parallel to the line of travel of the lure.

Another object is to provide an artificial fishing lure that is simple in construction, inexpensive to manufacture, durable and extremely efficient in use.

A further object of this invention is to provide a fishing lure of the type referred to in which all of the hook eyes are inter-connected to the line eye by resilient wire in a manner which does not interfere with the action of the lure.

Other features and advantages of this invention will become more readily apparent from the following description and the accompanying drawings in which Fig. 1 is a side elevational view of the lure;

Figure 1:
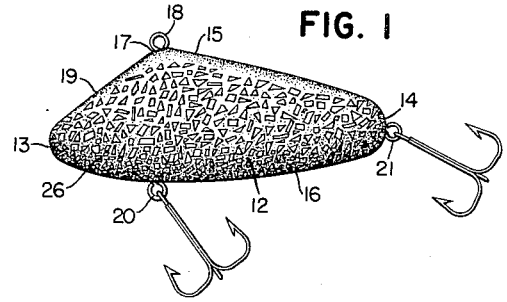
Figure 3:
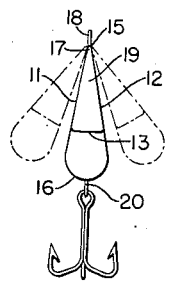
Fig. 3 is a front elevational view of the lure.
Figure 2:
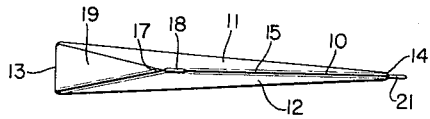
Fig. 2 is a top plan view of the lure.

Referring to the drawings, it will be noted that the lure of this invention is formed symmetrical with the longitudinal axis of the lure body generally referred to by the numeral 10. The sides 11 and 12 of the body 10 are of equal area and taper from the forward end 13 of the lure toward the rear or tail end 14 thereof, as shown in Fig. 2. As shown in Fig. 3, the sides 11 and 12 taper at an acute included angle from the upper edge 15 toward the bottom or lower edge 16 which is preferably rounded or arcuate in cross section. The upper edge 15 is angular in shape in plan view including an obtuse angle forming an apex 17 located forward of the mid section of the lure and preferably located approximately one-third of the length of the lure from the end 13. The line hook 18 is located at the apex 17 of the upper edge 15.

Figure 5:
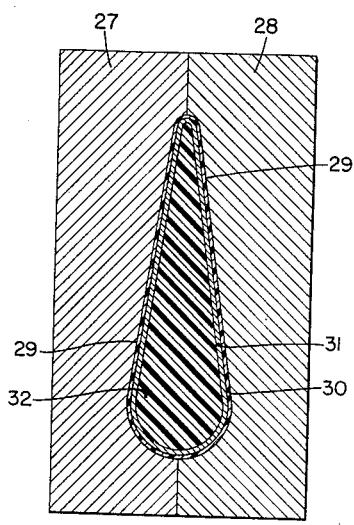
Fig. 5 is a sectional view of a mold for molding the lure of this invention.

In plan view, the lure is of generally elongated triangular shape and the upper edge 15 slopes from the forward end 13 toward the apex 17 at a greater angle of inclination to the longitudinal axis of the lure than the extent of the upper edge from the apex 17 toward the rear or aft end 14. The forward end 13 is provided with a surface 19 of substantially triangular shape as shown in Fig. 2. The portion of the body 10 rearward of the apex 17 has a substantially conical configuration in cross section as shown in Fig. 5. Hook eyes 20 and 21 are located respectively at the lower edge 16 immediately below the line hook 18 and at the aft end 14.

Figure 4:
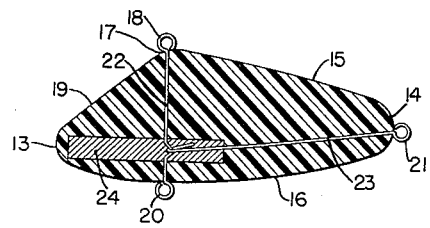
Fig. 4 is a longitudinal cross-sectional view of the lure.

Referring to Fig. 4 of the drawings, the hook eyes 20 and 21 and line eye 18 are preferably interconnected. The line eye 18 and hook eye 20 are connected by a spring wire element 22. The hook eye 21 is provided with a spring wire element 23 and wire elements 22 and 23 are interconnected and embedded in the lead weight 24 which is located immediately behind the forward end 13 and below the line eye 18.

Preferably the lure is made from synthetic resinous material which is resilient and flexible. Specifically, the lure of this invention is made of polyvinyl resin such as Geon which not only is flexible and resilient but is non-inflammable, odorless, and resistant to deterioration by both fresh and salt water.

Figure 6:
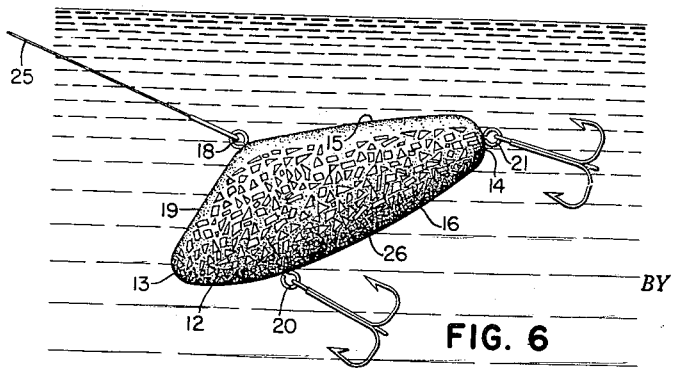
Fig. 6 is a side elevational view of the fish lure of this invention showing the position of the lure traveling in water.

With a line 25 connected to the line eye 18, the lure of this invention travels through water in the manner shown in Fig. 6 of the drawings. The depth at which the lure will run varies by the size of the weight 24 and the specific gravity of the plastic material from which the lure is made. As the lure travels through the water, a resistance is built up against the surface 19 which causes the longitudinal axis of the lure to be inclined to the direction of travel. It is believed that the flat sides tapered in both longitudinal and transverse directions relative to the lure cause the lure to oscillate rapidly about the line eye 18 in a direction transversely of the longitudinal axis of the lure.

To further simulate the appearance of a natural minnow, the lure is preferably provided with sparklers, fritters, or particles of similar solid material 26 which are embedded in the plastic material during the molding operation substantially below the surface of the lure. The particles 26 simulate the scales on a minnow and since they are located below the surface of the lure they are not only protected from deterioration by water but do not interfere with the soft pliable feel of the plastic material.

Referring to Fig. 5 of the drawings, the lure is preferably molded in a mold having two parts 27 and 28, each of which is provided with a similar mold cavity 29 symmetrical with the longitudinal axis of the lure. While the mold halves 27 and 28 are in open position, the interior surface of the cavity 29 is coated with a viscous layer 30 of transparent plastic material. A quantity of sparklers 31 is distributed within the cavity so as to adhere to the viscous material 30 and any excess of sparklers 31 is removed by inverting the mold halves so that the sparklers fall out by gravity. Thereafter, the line and hook eyes interconnected to each other and the weight 24 are placed in one of the mold halves and the mold is closed prior to being filled with a viscous plastic material 32. The article thus formed is kept in the mold until the plastic material hardens. It is seen that this method permits the layer of sparklers 31 to be completely embedded in the body of the lure at a uniform distance from the exterior surface thereof.

While certain representative embodiments and details have been shown for the purpose of illustrating the invention, it will be apparent to those skilled in this art that various changes and modifications may be made therein without departing from the spirit or scope of the invention.

I claim:

1. A fishing lure comprising an elongated body having flat sides symmetrically with the longitudinal axis of the lure, said sides tapering toward each other from the forward end to the tail end thereof, said flat sides also tapering from the bottom edge of the body to the upper edge thereof at an acute included angle, said sides having a generally triangular shape of equal area, a line eye located forward of the mid section of the body and at the highest point of the upper edge, said body being made of flexible resilient plastic material having a weight embedded therein behind the forward end and below said line eye, said line eye connected to said weight by a spring wire and a hook eye connected to said weight by a spring wire, said wires interconnected to each other within said weight and a hook eye located at the tail end of said body.

2. A fishing lure comprising an elongated body, an upper edge formed by the intersection of flat sides which are symmetrical with the longitudinal axis of the lure and having a generally triangular shape of equal area, said sides tapering towards each other from the forward end to the tail end of the body, said flat sides also tapering from the bottom edge to the upper edge at an acute included angle whereby the upper edge defined by said sides slopes towards the tail end of said body, and a line eye located forward of the mid section of the body and to the rear of the forward end thereof.

References Cited in the file of this patent

UNITED STATES PATENTS

| | | |
|---|---|---|
| D. 168,507 | Heiner | Dec. 30, 1952 |
| 1,101,223 | Welles | June 23, 1914 |
| 1,598,786 | Romadke | Sept. 7, 1926 |
| 2,184,031 | Wyatt | Dec. 19, 1939 |
| 2,353,995 | Conner | July 18, 1944 |
| 2,470,995 | Lesser | May 24, 1949 |
| 2,528,861 | Clasen et al. | Nov. 7, 1950 |
| 2,644,265 | Stettner | July 7, 1953 |
| 2,651,876 | Kohler et al. | Sept. 15, 1953 |